United States Patent
Vernon et al.

(10) Patent No.: US 12,391,000 B2
(45) Date of Patent: Aug. 19, 2025

(54) SYSTEM AND METHOD FOR CREATING LATTICE STRUCTURES

(71) Applicant: HONEYWELL FEDERAL MANUFACTURING & TECHNOLOGIES, LLC, Kansas City, MO (US)

(72) Inventors: Gregory John Vernon, Kansas City, MO (US); John Porter, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 1507 days.

(21) Appl. No.: 16/655,310

(22) Filed: Oct. 17, 2019

(65) Prior Publication Data

US 2021/0114305 A1    Apr. 22, 2021

(51) Int. Cl.
| | |
|---|---|
| *B29C 64/386* | (2017.01) |
| *B22F 10/80* | (2021.01) |
| *B33Y 10/00* | (2015.01) |
| *B33Y 50/00* | (2015.01) |
| *B33Y 50/02* | (2015.01) |
| *B33Y 80/00* | (2015.01) |
| *G06F 30/00* | (2020.01) |

(52) U.S. Cl.
CPC ............ *B29C 64/386* (2017.08); *B22F 10/80* (2021.01); *B33Y 50/00* (2014.12); *G06F 30/00* (2020.01); *B33Y 10/00* (2014.12); *B33Y 50/02* (2014.12); *B33Y 80/00* (2014.12)

(58) Field of Classification Search
CPC ....... B29C 64/386; B22F 10/80; B33Y 50/00; B33Y 50/02; B33Y 10/00; B33Y 80/00; G06F 30/00; G06F 30/12; G06F 30/20; G06F 30/23; G06F 2113/10

See application file for complete search history.

(56) References Cited

U.S. PATENT DOCUMENTS

| | | |
|---|---|---|
| 5,515,293 A | 5/1996 | Edwards |
| 6,147,688 A | 11/2000 | Clair |
| 8,982,121 B2 | 3/2015 | Hanniel et al. |
| 9,135,374 B2 | 9/2015 | Jones et al. |
| 9,902,114 B2 | 2/2018 | Musuvathy |
| 10,274,935 B2 | 4/2019 | Vernon |
| 10,528,684 B1 * | 1/2020 | Ayubi-Moak ........... G06F 30/39 |

(Continued)

*Primary Examiner* — Boris Gorney
*Assistant Examiner* — Bernard E Cothran
(74) *Attorney, Agent, or Firm* — Hovey Williams LLP (57) ABSTRACT

A system and method of creating a lattice structure for a part formed via additive manufacturing. The method includes generating a finite element mesh including a first finite element, generating a first natural space data structure such that the first finite element includes the first natural space data structure, generating a first unit cell corresponding to the first finite element, and generating a first design space data structure such that the first unit cell includes the first design space data structure and the first natural space data structure. The method further includes modifying the first unit cell via the first design space data structure and modifying the first unit cell via the first natural space data structure to correspond to the modifications of the first unit cell in the first design space data structure.

20 Claims, 9 Drawing Sheets

(56) References Cited

U.S. PATENT DOCUMENTS

| | | | |
|---|---|---|---|
| 2014/0278265 A1* | 9/2014 | Anderson | G06F 30/00 703/1 |
| 2015/0193559 A1* | 7/2015 | Musuvathy | G06F 30/17 703/1 |
| 2016/0209820 A1 | 7/2016 | Banadyga et al. | |
| 2017/0103510 A1* | 4/2017 | Wang | G06T 7/33 |

* cited by examiner

SYSTEM AND METHOD FOR CREATING LATTICE STRUCTURES

GOVERNMENT INTERESTS

This invention was made with Government support under Contract No.: DE-NA0000622 awarded by the United States Department of Energy/National Nuclear Security Administration. The Government has certain rights in the invention.

BACKGROUND

Additive manufacturing is often used for creating prototypes and unique, complex, and/or low-production parts. Such parts are often based on lattice structures designed via computer aided design (CAD) interfaces. To that end, finite element meshes are used to define the location and/or deformation of unit cells that constitute the lattice structures. Some finite elements have unusual or unconventional shapes, which makes unit cells corresponding to those finite elements difficult to visualize and design within natural coordinate structures of those finite elements.

Finite element meshes also incorporate finite elements having different shapes whose shape functions mathematically conform with each other. In such cases, a designer may wish to design a unit cell that mates with a neighboring unit cell of a different finite element shape. The unit cells are typically designed separately in different coordinate systems, which can be difficult.

Furthermore, unit cells may have conditional features that are not present when the unit cells are mated with neighboring unit cells to form a lattice structure. For example, a unit cell may have an exterior surface that is removed if the unit cell is an internal cell but is retained if the unit cell is part of a side of the lattice structure. Automatically varying a unit cell according to its exposure while also maintaining conformance between neighboring unit cells can be difficult.

SUMMARY OF THE INVENTION

Embodiments of the present invention solve the above-mentioned problems and provide a distinct advance in the art of additive manufacturing. More particularly, the present invention provides a computer modeling and additive manufacturing system for creating an additive manufacturing part lattice structure via a combination of data structures.

An embodiment of the present invention is a method of creating a lattice structure. A finite element mesh having a number of finite elements is first generated. A first natural space data structure is then generated for a first one of the finite elements. The first natural space data structure may be selected from one of several natural space data structures to correspond to one of several natural spaces such as an equilateral pyramid, a 1×1×1 pyramid, or an isoparametric pyramid.

A first unit cell corresponding to the first finite element is then generated. The first unit cell may be a repeatable structural unit for populating a lattice structure and may itself be a wire-frame model, surface model, solid model, or any other suitable CAD model. The first unit cell may have a shape that coincides with the shape of the first finite element. The first unit cell may include truss members, cross members, frame-like members, or any other structural components and may have chamfers, fillets, recesses, arches, complex curves, through-holes, channels, voids, chambers, and other negative spaces. The first unit cell may have "snap-to locations" such as a vertex, an edge center, a face centroid, a volume centroid, an incenter, and a circumcenter.

A first design space data structure is then generated for the first unit cell. The first design space data structure may be selected from one of several design space data structures to correspond to one of several design spaces such as an equilateral pyramid, a 1×1×1 pyramid, or an isoparametric pyramid.

Mapping between the natural space, the design space, and the finite element mesh data structures may be achieved via a geometric map defined via shape functions. For example, function $f$ may be the shape function mapping the natural space to the design space. Function g may be the shape function mapping the natural space to the finite element mesh. Thus, both the design space and the finite element mesh are images of the natural space under the geometric map.

The first unit cell thereby includes the first natural space data structure of the corresponding first finite element, and the first design space data structure. That is, the first natural space data structure and the first design space data structure are included in a unit cell definition of the first unit cell.

Natural space data structures may also be selected from a plurality of natural space data structures and generated for other finite elements in the finite element mesh. Additional design space data structures may be selected and generated for each unit cell in the lattice structure such that each unit cell includes a natural space data structure and a design space data structure.

The first unit cell may be modified via the first design space data structure according to user inputs. For example, the user may deform the first unit cell in an intuitive Cartesian coordinate system. For example, the first unit cell may be modified via the first design space data structure according to the snap-to locations.

The first unit cell may be modified via the first natural space data structure to correspond to the modifications of the first unit cell in the first design space data structure. That is, deformations and other manipulations initiated by the user may be replicated in terms of the first natural space data structure.

The first unit cell may be mated with a second unit cell corresponding to a second finite element via the first natural space data structure and a second natural space data structure of the second unit cell. To that end, the first finite element and the second finite element may be linked via global identifiers. This is particularly useful if the first finite element and the second finite element (and hence the first unit cell and the second unit cell) have different shapes, such as a hexahedral-pyramid and a tetrahedral pyramid.

In another embodiment, it may be desirable to modify a shape of a unit cell. In such a case, a finite element corresponding to the unit cell may be modified to a deformed state. To that end, the deformed state may be user defined or may be a finite element shape selected from a plurality of preset finite element shapes. The unit cell may be modified according to the deformed state of the finite element via its natural space data structure so that the unit cell has the desired shape.

In another embodiment, a unit cell may be modified via its natural space data structure such that the unit cell includes an interfacing feature. The interfacing feature may be mated with an interfacing feature of another unit cell. This may be performed via the unit cell's natural space data structure and then replicated in terms of the unit cell's design space data structure for interpretation and further modification by the user.

In some embodiments, a finite element mesh corresponding to a lattice cell structure may undergo additional deformation such as smoothing, Jacobian optimization, Laplace optimization, regularity optimization, or other deformations. The finite element mesh may also be manually deformed, modified, or edited.

In another embodiment, unit cells may be modified to have a conditional feature. For example, a unit cell may include conditional features located on its faces. If a face is to be adjacent to a face of another unit cell, its conditional feature may be omitted. Meanwhile, if the face is not to be adjacent to a face of another unit cell (such as on an exterior surface of a lattice structure), its conditional feature may be kept. As another example, a conditional feature may be omitted if a unit cell is deformed beyond a certain threshold such that the conditional feature would be too small or too warped if it was to be retained.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
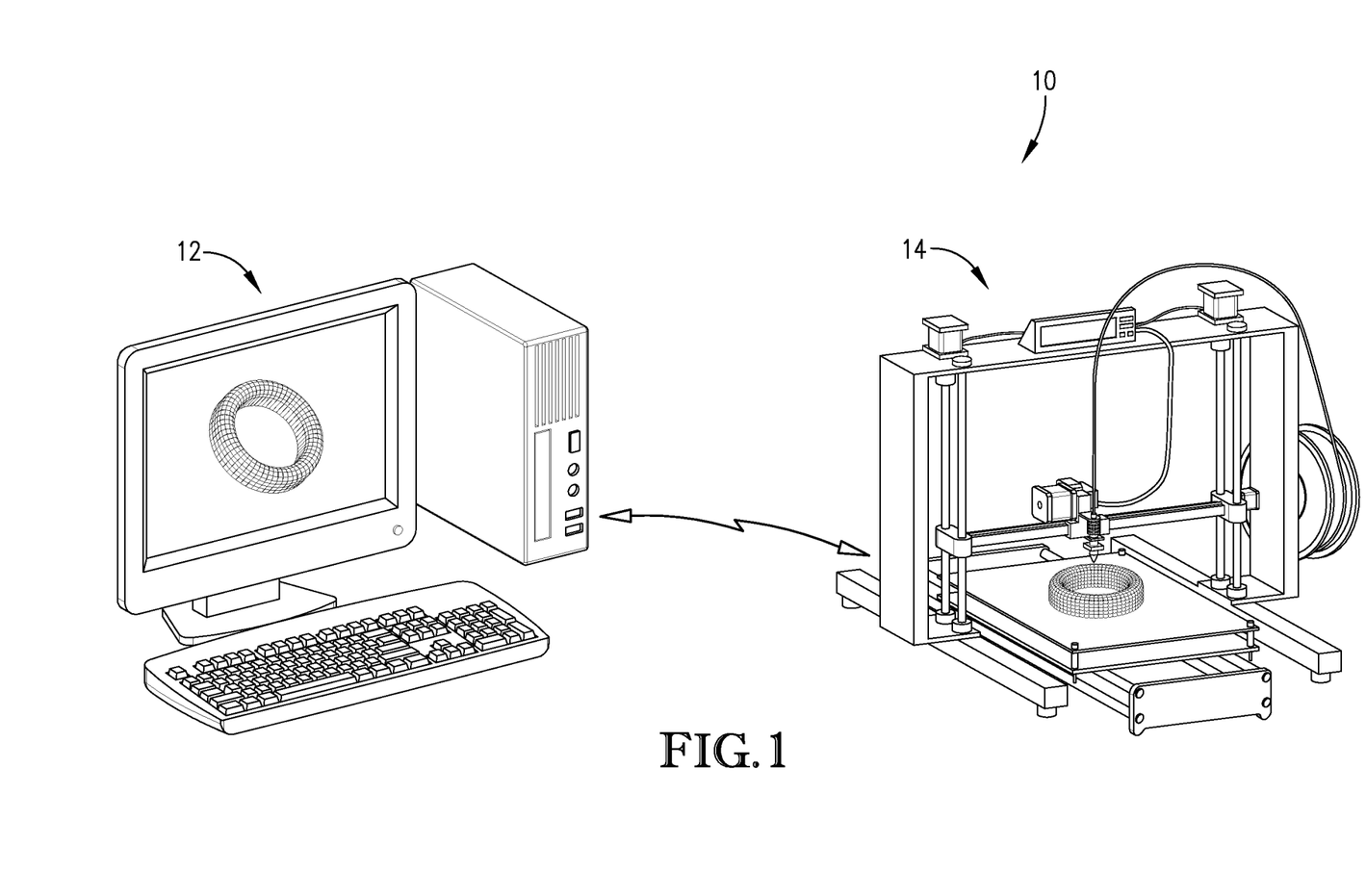
FIG. 1 is a perspective view of a computer modeling and additive manufacturing system constructed in accordance with an embodiment of the present invention.
Figure 2:
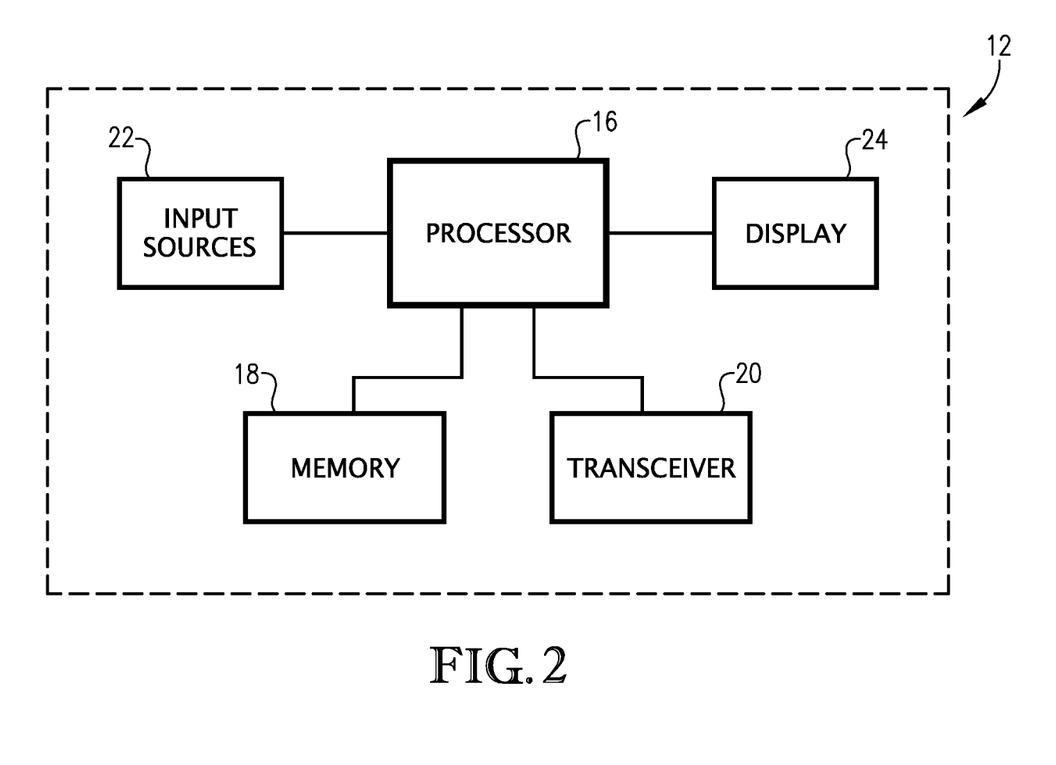
FIG. 2 is a schematic view of the computer modeling system of FIG. 1.
Figure 3:
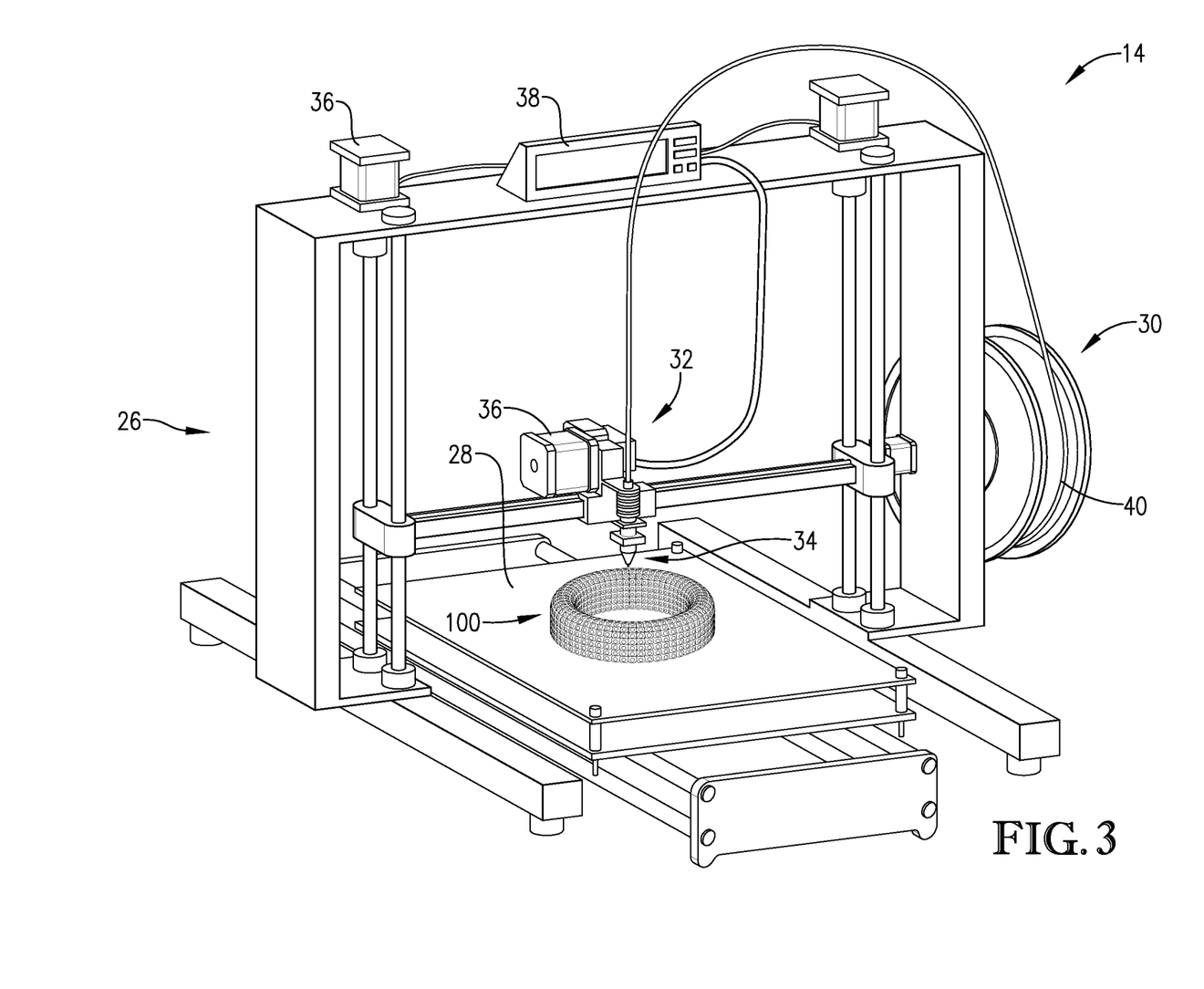
FIG. 3 is a perspective view of the additive manufacturing system of FIG. 1.

Turning to the drawing figures, and particularly FIGS. 1-3, a computer modeling and additive manufacturing system 10 constructed in accordance with an embodiment of the present invention is illustrated. The computer modeling and additive manufacturing system 10 may be used to create a part, such as part 100, and broadly comprises a computer aided design (CAD) system 12 and an additive manufacturing system 14.

The CAD system 12 may be used for designing and generating a computer model of the part 100 and broadly includes a processor 16, a memory 18, a transceiver 20, a plurality of inputs 22, and a display 24. The CAD system 12 may be integral with or separate from the additive manufacturing system 14.

The processor 16 generates the computer model of the part 100 according to inputs and data received from a user. The processor 16 may include a circuit board, memory, display, inputs, and/or other electronic components such as a transceiver or external connection for communicating with external computers and the like.

The processor 16 may implement aspects of the present invention with one or more computer programs stored in or on computer-readable medium residing on or accessible by the processor. Each computer program preferably comprises an ordered listing of executable instructions for implementing logical functions in the processor 16. Each computer program can be embodied in any non-transitory computer-readable medium, such as the memory 18 (described below), for use by or in connection with an instruction execution system, apparatus, or device, such as a computer-based system, processor-containing system, or other system that can fetch the instructions from the instruction execution system, apparatus, or device, and execute the instructions.

The memory 18 may be any computer-readable non-transitory medium that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The transceiver 20 may transmit data and instructions between the CAD system 12 and the additive manufacturing system 14 over a wireless communication network. Alternatively, a wired or integrated setup may be used between the CAD system 12 and the additive manufacturing system 14.

The inputs 22 allow a user to design and modify a model of the part 100 and may comprise a keyboard, mouse, trackball, touchscreen, buttons, dials, virtual inputs, and/or a virtual reality simulator. The inputs 22 may also be used to control or instruct the additive manufacturing system 14.

The display 24 may display a two-dimensional or three-dimensional representation of the model and may also display model data, computer options, and other information via a CAD graphical user interface (GUI). The display 24 may be separate from or integrated with the additive manufacturing system 14.

The additive manufacturing system 14 produces prototypes and parts such as part 100 and broadly includes a frame 26, a support surface 28, a material reserve 30, a feeder 32, a material applicator 34, a set of motors 36, and a processor 38. The additive manufacturing system 14 may be integral with or separate from the CAD system 12.

The frame 26 provides structure for the support surface 28, material reserve 30, feeder 32, material applicator 34, motors 36, and/or the processor 38 and may include a base, vertical members, cross members, and mounting points for mounting the above components thereto. Alternatively, the frame 26 may be a walled housing or similar structure.

The support surface 28 supports the part 100 as it is being constructed and may be a stationary or movable flat tray or bed, a substrate, a mandrel, a wheel, scaffolding, or similar support. The support surface 28 may be integral with the additive manufacturing system 14 or may be removable and transferable with the part 100 as the part 100 is being constructed.

The material reserve 30 retains additive manufacturing material 40 and may be a hopper, tank, cartridge, container, spool, or other similar material holder. The material reserve may be integral with the additive manufacturing system 14 or may be disposable and/or reusable.

The additive manufacturing material 40 may be used for forming part 100 and may be in pellet or powder form, filament or spooled form, or any other suitable form. The additive manufacturing material 40 may be any plastic, polymer, or organic material suitable for use in additive manufacturing. For example, the additive manufacturing material 40 may be acrylonitrile butadiene styrene (ABS), polyamide, straw-based plastic, or other similar material.

The feeder 32 directs the additive manufacturing material 40 to the material applicator 34 and may be a spool feeder, a pump, an auger, or any other suitable feeder. Alternatively, the additive manufacturing material 40 may be gravity fed to the material applicator 34.

The material applicator 34 deposits the additive manufacturing material 40 onto the support surface 28 and previously constructed layers. The material applicator 34 may include a nozzle, guide, sprayer, or other similar component for channeling the additive manufacturing material 40 and a laser, heater, or similar component for melting the additive manufacturing material and bonding (e.g., sintering) the additive manufacturing material 40 onto a previously constructed layer. The material applicator 34 may be sized according to the size of the pellets, powder, or filament being deposited.

The motors 36 position the material applicator 34 over the support surface 28 and previously constructed layers and move the material applicator 34 as the additive manufacturing material is deposited onto the support surface 28 and the previously constructed layers. The motors 36 may be oriented orthogonally to each other so that a first one of the motors 36 is configured to move the material applicator 34 in a lateral "x" direction, a second one of the motors 36 is configured to move the material applicator 34 in a longitudinal "y" direction, and a third one of the motors 36 is configured to move the material applicator 34 in an altitudinal "z" direction. Alternatively, the motors 36 may move the support surface 28 (and hence the part 100) while the material applicator 34 remains stationary.

The processor 38 directs the material applicator 34 via the motors 36 and activates the material applicator 34 such that the material applicator 34 deposits the additive manufacturing material 40 onto the support surface 28 and previously constructed layers according to a computer aided design of the part. The processor 38 may include a circuit board, memory, display, inputs, and/or other electronic components such as a transceiver or external connection for communicating with the processor 16 of the CAD system 12 and other external computers. It will be understood that the processor 38 may be one and the same as processor 16 of the CAD system 12.

The processor 38 may implement aspects of the present invention with one or more computer programs stored in or on computer-readable medium residing on or accessible by the processor. Each computer program preferably comprises an ordered listing of executable instructions for implementing logical functions in the processor 38. Each computer program can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

It will be understood that the additive manufacturing system 14 may be any type of additive manufacturing or "3D printing" system such as a sintering, laser melting, laser sintering, extruding, fusing, stereolithography, extrusion, light polymerizing, powder bed, wire additive, or laminated object manufacturing system. The additive manufacturing system 14 may also be a hybrid system that combines additive manufacturing with molding, scaffolding, and/or other subtractive manufacturing or assembly techniques.

Figure 10:
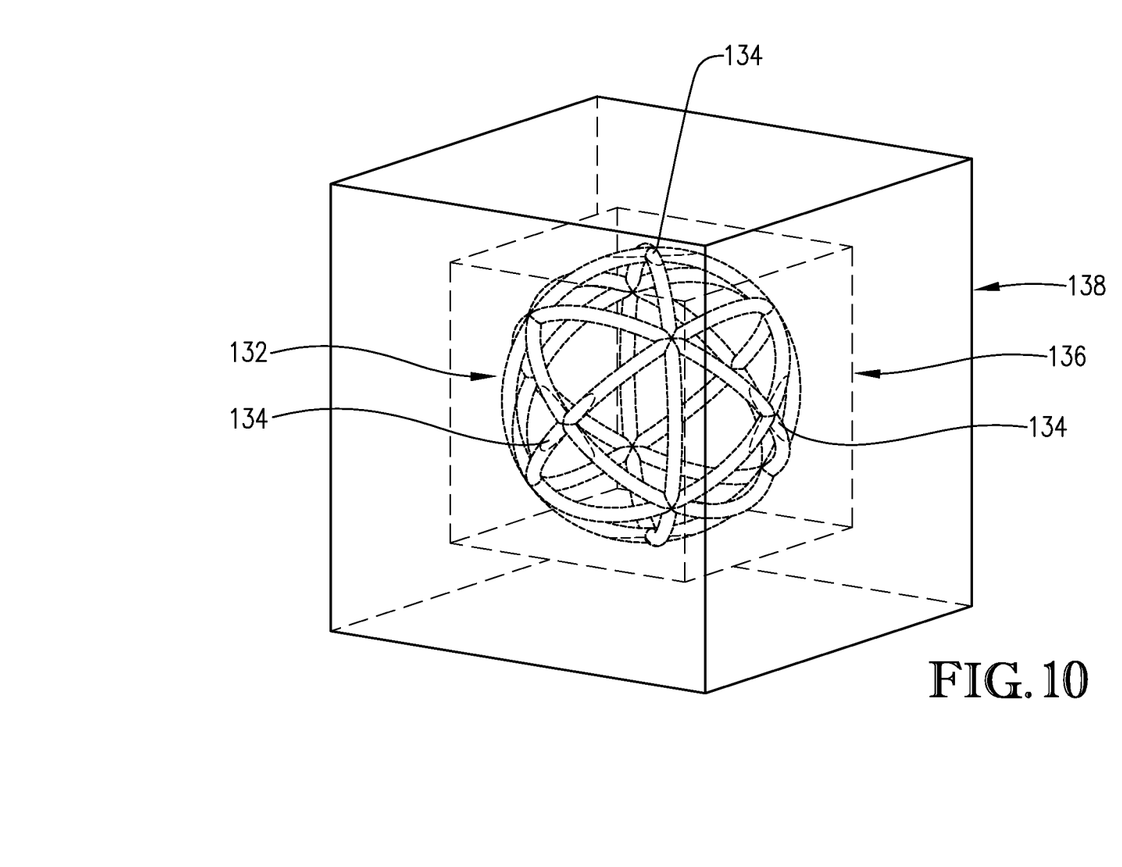
FIG. 10 is a perspective view of a unit cell constructed in accordance with an embodiment of the invention and shown in a design space and a natural space.
Figure 11:
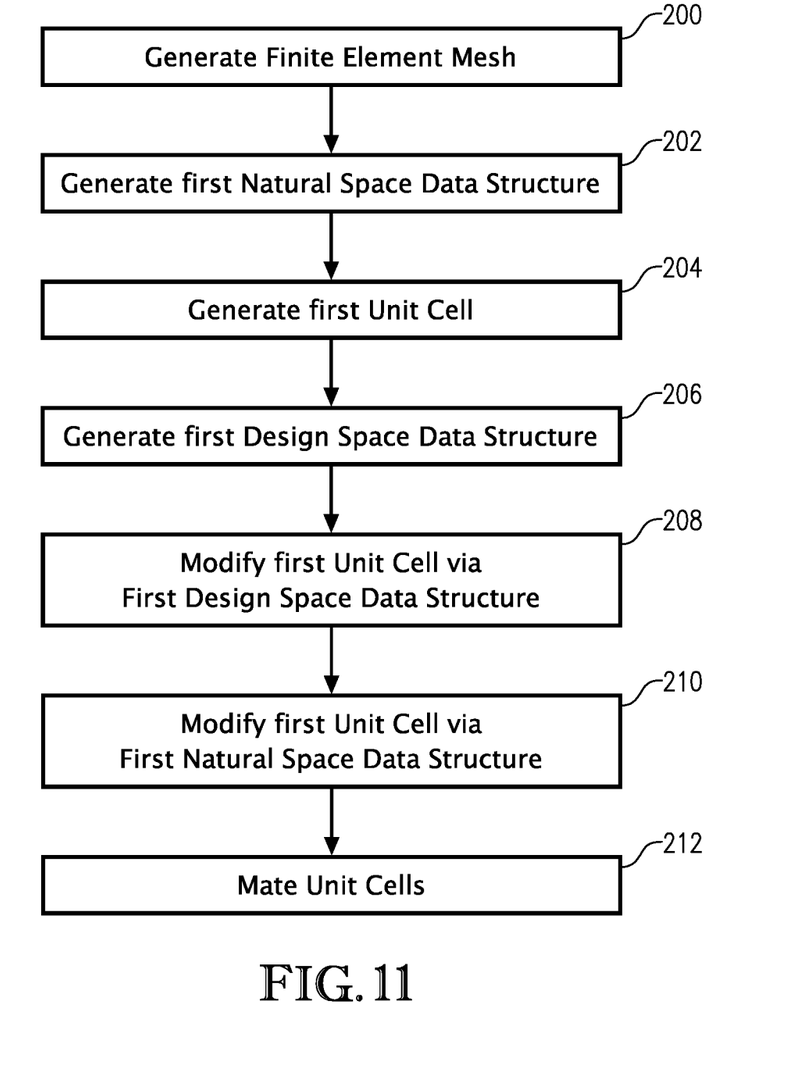
FIG. 11 is a flow diagram of a method of creating a lattice structure via the computer modeling system of FIG. 2.

Turning to FIG. 11 and with reference to FIGS. 4-10, use of the computer modeling and additive manufacturing system 10 for creating a lattice structure of a part via a combination of data structures and forming the part via additive manufacturing according to the lattice structure will now be described in detail.

First, a finite element mesh 102 may be generated via the CAD interface, as shown in block 200. The finite element mesh 102 may include a plurality of mesh elements including a first finite element 104. Each mesh element may have a number of corner nodes 106, a number of edge midpoint nodes 108, face midpoint nodes, volume midpoint nodes, and/or any other nodes forming the basis of mesh element manipulation, deformation, linking, mating, unlinking, and demating. For example, an 8-node hex will have corner nodes. A 20-node hex will have corner nodes and edge midpoint nodes. A 27-node hex will have corner nodes, edge midpoint nodes, face midpoint nodes, and a volume midpoint node.

The finite element mesh 102 may be a first order, second order, or higher order finite element mesh and may include triagonal, quadrilateral, tetrahedral, pyramidal, hexahedral, dodecahedral, or other polyhedral sub-volume shapes. Each mesh element may have a shape selected from a plurality of shapes. Alternatively, the mesh elements may be modified to have a desired shape. The finite element mesh 102 thus includes sub-volumes (i.e., the mesh elements) that provide spatial coordinates, as defined by the nodes for deformation processing.

Figure 4:
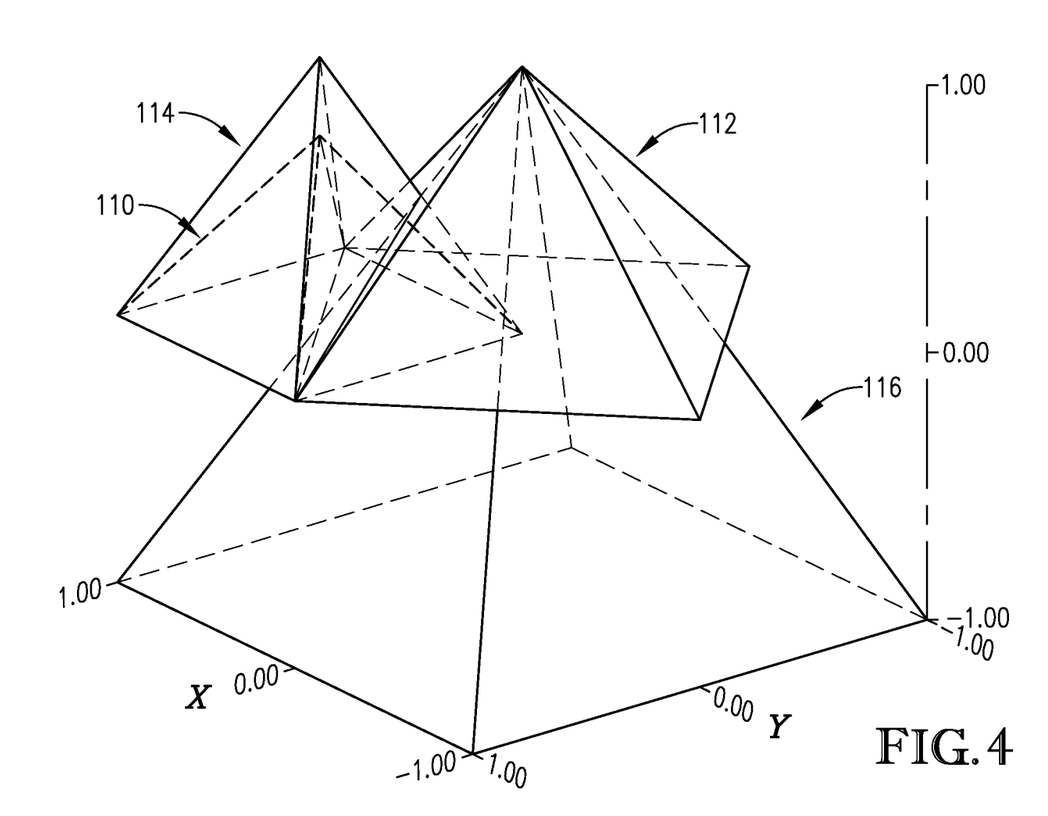
FIG. 4 is a perspective view of several design spaces and natural spaces.

A first natural space data structure may be generated for the first finite element, as shown in block 202. The first natural space data structure may be particularly suitable for back-end finite element manipulation, deformation, linking, mating, unlinking, and demating. The first natural space data structure may be selected from one of several natural space data structures to correspond to one of several natural spaces such as an equilateral pyramid 110 or 112, a 1×1×1 pyramid 114, or an isoparametric pyramid 116, as shown in FIG. 4. For example, a natural space data structure based on an isoparametric pyramid may be selected and generated. Mapping between natural space data structures and finite element meshes will be discussed in more detail below.

A first unit cell 118 corresponding to the first finite element 104 may then be generated, as shown in block 204. The first unit cell 118 may be a repeatable structural unit for populating a lattice structure 122 and may itself be a wire-frame model, surface model, solid model, or any other suitable CAD model. The first unit cell 118 may have a shape that coincides with the shape of the first finite element 104. For example, if the first finite element 104 is a hexahedron, the first unit cell may be hexahedral and may extend to boundaries, faces, and/or nodes of the first finite element 104. The first unit cell 118 may include truss members, cross members, frame-like members, or any other structural components and may have chamfers, fillets, recesses, arches, and complex curves. The first unit cell 118 may also include through-holes, channels, voids, chambers, and other negative spaces. The first unit cell 118 may be honeycomb shaped, cube shaped, tube shaped, or any other suitable base shape. The first unit cell 118 may have "snap-to locations" such as a vertex, an edge center, a face centroid, a volume centroid, an incenter, and a circumcenter.

A first design space data structure may be generated for the first unit cell 118 as shown in block 206. The first design space data structure may be particularly suitable for front-end unit cell manipulation, deformation, linking, mating, unlinking, and demating. The first design space data structure may be selected from one of several design space data structures to correspond to one of several design spaces such as an equilateral pyramid 110 or 112, a 1×1×1 pyramid 114, or an isoparametric pyramid 116, as shown in FIG. 4. For example, the user may choose to design in an isoparametric pyramid design space. A design space data structure based on an isoparametric pyramid may thereby be selected. Mapping between design space data structures, natural space data structures, and finite element meshes will be discussed in more detail below.

The first unit cell 118 thereby includes the first natural space data structure of the first finite element 104, and the first design space data structure. That is, the first natural space data structure and the first design space data structure may be included in a unit cell definition of the first unit cell 118.

Natural space data structures may also be selected from a plurality of natural space data structures and generated for other finite elements in the finite element mesh 102. Additional design space data structures may be selected and generated for each unit cell in the lattice structure 122 such that each unit cell includes a natural space data structure and a design space data structure.

The first unit cell 118 may then be modified via the first design space data structure according to user inputs, as shown in block 208. For example, the user may deform the first unit cell 118 in an intuitive Cartesian coordinate system. These deformations and other manipulations via the first design space data structure may be front-end steps that may be intuitive to the user. For example, the first unit cell 118 may be modified via the first design space data structure according to the snap-to locations.

The first unit cell 118 may then be modified via the first natural space data structure to correspond to the modifications of the first unit cell 118 in the first design space data structure, as shown in block 210. That is, these deformations and other manipulations initiated by the user may be replicated in terms of the first natural space data structure. Manipulations via the first natural space data structure may be back-end steps that may not necessarily be intuitive or known to the user.

Figure 5:
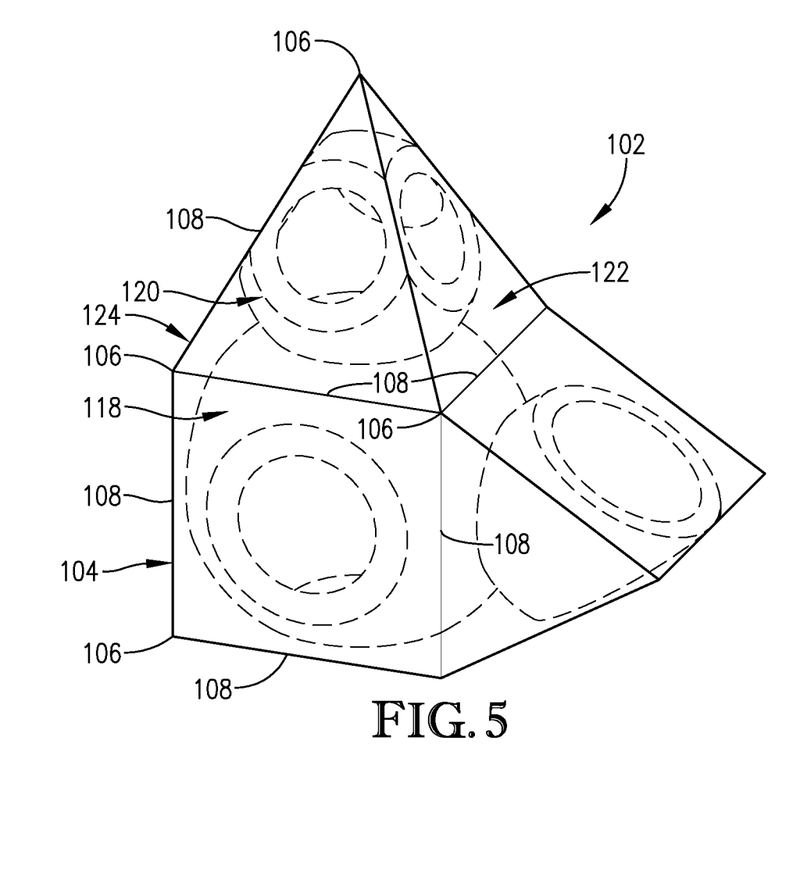
FIG. 5 is a perspective view of a finite element mesh and a lattice structure generated in accordance with an embodiment of the invention.
Figure 6:
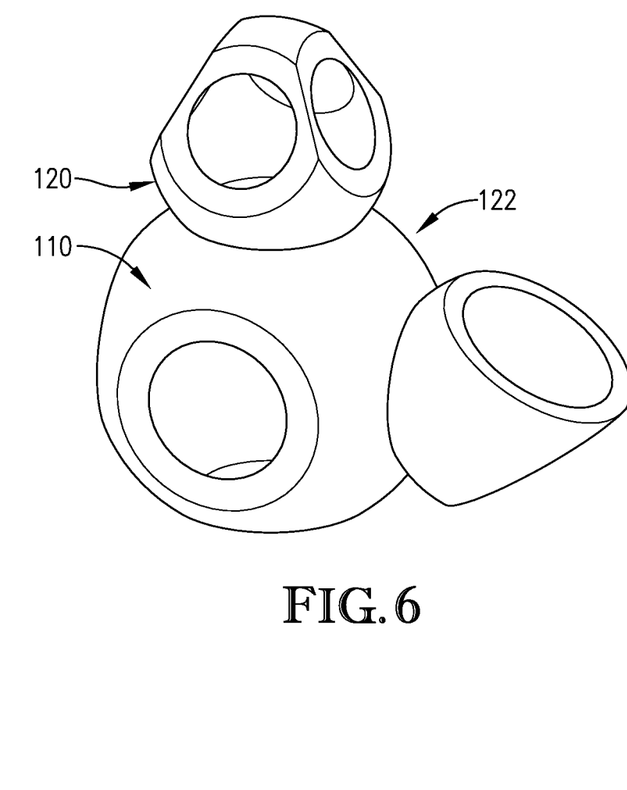
FIG. 6 is a perspective view of the lattice structure of FIG. 5.

The first unit cell 118 may then be mated with a second unit cell 120 of the lattice structure 122 corresponding to a second finite element 124 via the first natural space data structure and a second natural space data structure of the second unit cell 120, as shown in block 212 and FIGS. 5 and 6. To that end, the first finite element 104 and the second finite element 124 may be linked via global identifiers. This may be a back-end step that may not necessarily be intuitive to the user.

It may also be desirable for unit cells to be modified to have different shapes. For example, the second unit cell 120 may be modified to a deformed state (e.g., from a hexahedral shape to a pyramid shape). To that end, the deformed state may user defined or may be a finite element shape selected from a plurality of finite element shapes. The second unit cell 120 may be modified according to the deformed state of the second finite element 124 via the second natural space data structure so that the second unit cell 120 has the desired shape.

In one embodiment, the first unit cell 118 may be modified via the first natural space data structure such that the first unit cell 118 includes an interfacing feature. The interfacing feature of the first unit cell 118 may be mated with an interfacing feature of the second unit cell 120. This may be performed via the natural space data structure and then replicated in terms of the design space data structure for interpretation by the user.

Similarly, the first unit cell 118 may be unmated from the second unit cell via the first natural space data structure and the second natural space data structure. To that end, the first finite element 104 and the second finite element 104 may be unlinked by removing or deleting the global identifiers.

In some embodiments, a finite element mesh may undergo additional deformation such as smoothing, Jacobian optimization, Laplace optimization, regularity optimization, or other deformations. The finite element mesh may also be manually deformed, modified, or edited. For example, finite element mesh 126 shown in FIGS. 7-9 includes a hexahedral finite element 128 and a wedge finite element 130 reshaped to create one of several multi-element wedges arranged around an axis.

In another embodiment, unit cells may be modified to have a conditional feature. For example, unit cell 132 includes conditional features 134 located on its faces, as shown in FIG. 10. If a face is to be adjacent to a face of another unit cell, its conditional feature 134 may be omitted. Meanwhile, if the face is not to be adjacent to a face of another unit cell (such as on an exterior surface of a lattice structure), its conditional feature 134 may be kept. Note that the faces of the unit cell 132 coincide with a design space 136, whereas the unit cell 132 is defined entirely within a natural space 138. As another example, a conditional feature may be omitted if a unit cell is deformed beyond a certain threshold such that the conditional feature would be too small or too warped if it was to be retained.

Figure 12:
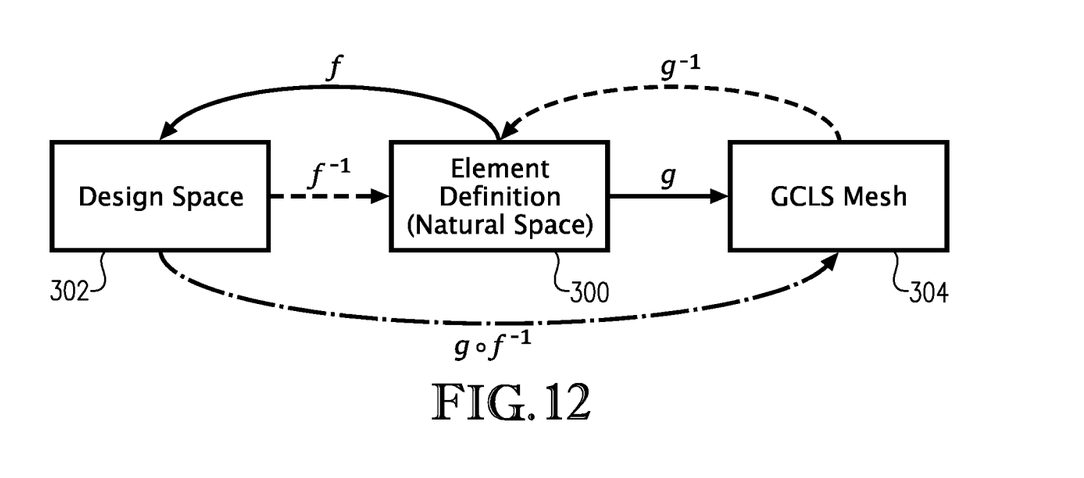
FIG. 12 is a schematic diagram of showing mapping between data structures according to an embodiment of the invention.

Turning to FIG. 12, mapping between data structures will be described in more detail. Once a natural space 300 is defined, a geometric map between the natural space 300, the design space 302, and the finite element mesh 304 (a geometry compliant lattice structure (GCLS) mesh in this case) is defined via shape functions. The two solid line arrows represent mappings that are defined. Specifically, function $f$ may be the shape function mapping the natural space 300 to the design space 302. Function g may be the shape function mapping the natural space 300 to the finite element mesh 304. Thus, both the design space 302 and the finite element mesh 304 are images of the natural space 300 under the geometric map.

The same map could be chosen for both images such that $f \equiv g$. In this case, the inverse of the map from the natural space 300 to the design space 302 enables conversion from the design space 302 to the natural space 300. Alternatively, different maps could be chosen (such that $f$ and g are not identical) but with the same domain for both maps. For example, a linear mapping could be used between the natural space 300 and the design space 302 while a second-degree (or higher) mapping could be used between the natural space 300 and the finite element mesh 304.

The directions of the horizontal arrows show the flow of information from the design space 302 to the finite element mesh 304. One can convert directly from the design space 302 to the finite element mesh 304 using the composition function $g \cdot f^{-1}$, represented by the dash-dot line.

Figure 7:
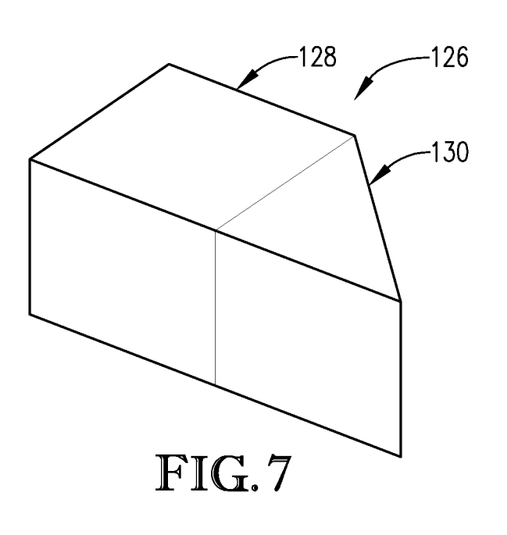
FIG. 7 is a perspective view of a finite element mesh constructed in accordance with another embodiment of the invention.
Figure 8:
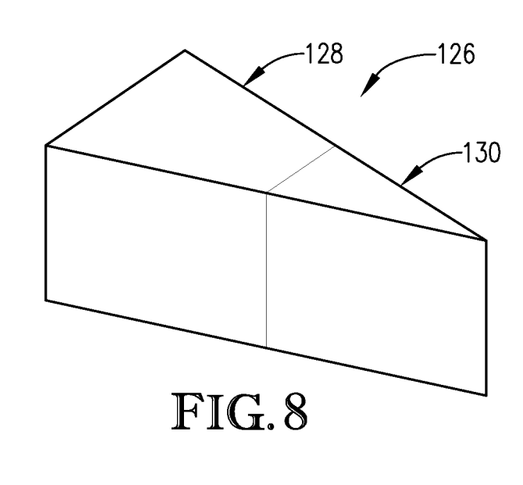
FIG. 8 is a perspective view of the finite element mesh of FIG. 7 with elements of the finite element mesh modified to form a multi-element wedge.
Figure 9:
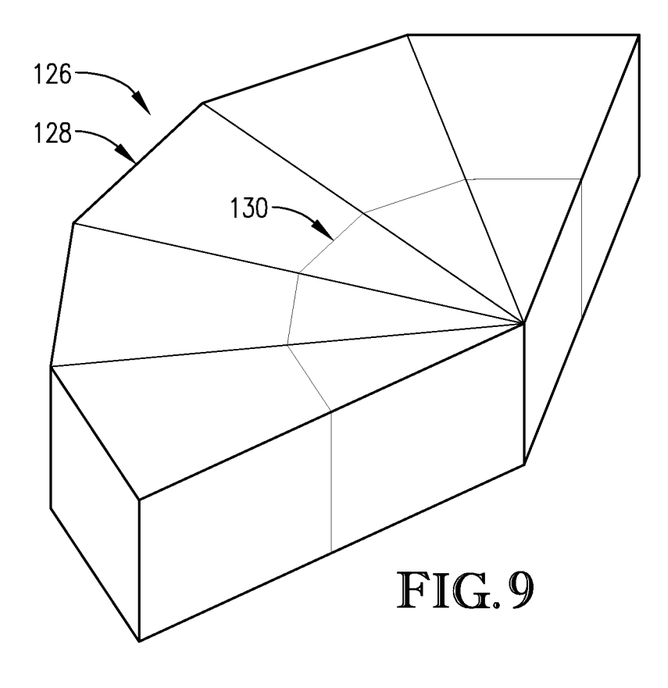
FIG. 9 is a perspective view of the finite element mesh of FIGS. 7 and 8 including several multi-element wedges.

As an example, the above mapping techniques can be used to convert between the models in FIGS. 7-9, where FIG. 7 shows a hexahedron natural space and a pentahedron natural space, FIG. 8 shows a design space, and FIG. 9 shows a GLCS mesh. Shape function $f$, which may include $f_h$ (for the hexahedron component) and $f_p$ (for the pentahedron component), maps the hexahedron natural space and the pentahedron natural space of FIG. 7 to the design space of FIG. 8. The inverses of these functions map the design space back to the natural spaces. Shape function g, which may include $g_h$ and $g_p$, maps the natural spaces of FIG. 7 to the GLCS mesh of FIG. 9. The inverses of these functions map the GLCS mesh back to the natural spaces.

Figure 13:
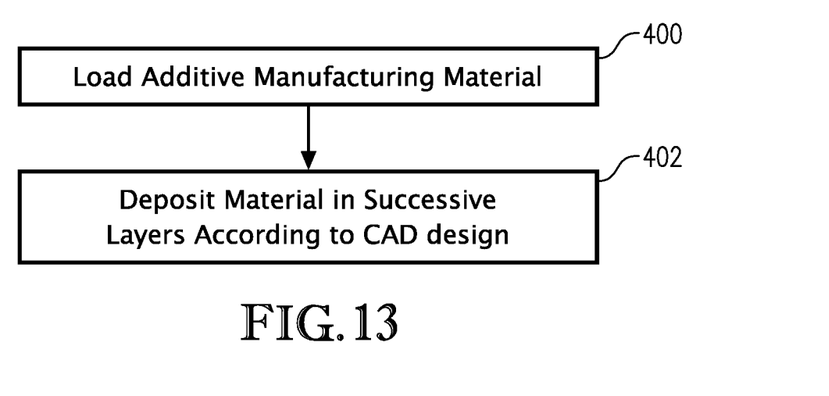
FIG. 13 is a flow diagram of a method of forming a part based on the lattice structure via the additive manufacturing system of FIG. 3.

Turning to FIG. 13, the part 100 may then be created via the additive manufacturing system 14. First, the additive manufacturing material may be inserted in or positioned on the material reserve 20 of the additive manufacturing system 14, as shown in block 400. For example, a spool of the additive manufacturing material 40 may be loaded onto the additive manufacturing system 14.

The additive manufacturing material 40 may then be deposited onto the support surface 28 via the material applicator 34 in successive layers according to the computer-aided design of the part 100, as shown in block 402. To that end, activation of horizontally oriented motors in various amounts allows for diagonal movement and curved movement of the material applicator 34. Activation of a vertically oriented motor may be used for relocating the material applicator 34 without depositing material and/or raising the material applicator 34 for creation of a new layer (see motors 36, above).

It will be understood that the above-described steps may be performed in any order, including simultaneously. In addition, some of the steps may be repeated, duplicated, and/or omitted without departing from the scope of the present invention.

The above-described computer modeling and additive manufacturing system 10 and method provide several advantages over conventional systems. For example, the design data structure and the natural space data structure being included in unit cell definitions allows designers to design unit cells within one or more preferred, easy to comprehend spaces while facilitating unit cell and lattice structure generation and manipulation. Designing and mating unit cells corresponding to finite elements having different finite element shapes is simplified. Varying unit cells according to their exposure while maintaining neighboring unit cell conformance is also streamlined. Dual-linked face-edge-node connected graph data structures including global identifiers allow for rapid insertion and manipulation of unit cell features. The CAD interface allows for easily converting between different design spaces and between different natural spaces.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of creating a lattice structure for a part formed via additive manufacturing, the method comprising the steps of:
   generating, via a processor, a finite element mesh having a plurality of finite elements including a first finite element;

generating, via the processor, a first natural space data structure such that the first finite element includes the first natural space data structure, the first natural space data structure being configured for back-end manipulation, deformation, linking, mating, unlinking, and demating;

generating, via the processor, a first unit cell corresponding to the first finite element;

generating, via the processor, a first design space data structure such that the first unit cell includes the first design space data structure and the first natural space data structure, the first design space data structure being configured for front-end manipulation, deformation, linking, mating, unlinking, and demating, the first design space data structure being a different data structure than the first natural space data structure;

generating, via the processor, a geometric map between the first natural space data structure, the first design space data structure, and the finite element mesh, the geometric map including a first shape function mapping the first natural space data structure to the first design space data structure and a second shape function mapping the first natural space data structure to the finite element mesh;

modifying, via the processor, the first unit cell via the first design space data structure according to user inputs; and modifying, via the processor, the first unit cell via the first natural space data structure to correspond to the modifications of the first unit cell in the first design space data structure according to an inverse of the first shape function.

2. The method of claim 1, further comprising a step of mating, via the processor, the first unit cell with a second unit cell via the first natural space data structure and a second natural space data structure of the second unit cell.

3. The method of claim 2, wherein the step of mating the first unit cell with the second unit cell includes linking, via the processor, the first finite element and a second finite element corresponding to the second unit cell via global identifiers of a dual-linked face-edge-node connected graph.

4. The method of claim 2, further comprising a step of demating, via the processor, the first unit cell and the second unit cell by unlinking the first finite element and a second finite element via global identifiers of a dual-linked face-edge-node connected graph.

5. The method of claim 2, further comprising:
modifying, via the processor, the first unit cell via the first natural space data structure such that the first unit cell includes an interfacing feature; and
mating, via the processor, the interfacing feature of the first unit cell with an interfacing feature of the second unit cell.

6. The method of claim 1, further comprising a step of modifying, via the processor, the first unit cell to have a conditional feature via the first natural data structure.

7. The method of claim 6, further comprising a step of expressing, via the processor, the conditional feature if the first unit cell is located on an exterior surface of the lattice structure.

8. The method of claim 1, further comprising a step of selecting, via the processor, a finite element shape from a plurality of shapes such that the first finite element has the selected finite element shape.

9. The method of claim 1, further comprising modifying, via the processor, the first unit cell via the first design space data structure according to a snap-to location of one of a vertex location, an edge center, a face centroid, a volume centroid, an incenter, and a circumcenter.

10. The method of claim 1, further comprising a step of selecting, via the processor, the first design space data structure from a plurality of design space data structures according to a design space data structure input from a user.

11. The method of claim 1, further comprising a step of selecting, via the processor, the first natural space data structure from a plurality of natural space data structures such that the first natural space data structure corresponds to the selected natural space data structure.

12. A method of creating a lattice structure for a part formed via additive manufacturing, the method comprising the steps of:

generating, via a processor, a finite element mesh having a plurality of finite elements including a first finite element having a first shape;

generating, via the processor, a first natural space data structure such that the first finite element includes the first natural space data structure, the first natural space data structure being configured for back-end manipulation, deformation, linking, mating, unlinking, and demating;

generating, via the processor, a first unit cell corresponding to the first finite element;

generating, via the processor, a first design space data structure such that the first unit cell includes the first design space data structure and the first natural space data structure, the first design space data structure being configured for front-end manipulation, deformation, linking, mating, unlinking, and demating, the first design space data structure being a different data structure than the first natural space data structure;

generating, via the processor, a geometric map between the first natural space data structure, the first design space data structure, and the finite element mesh, the geometric map including a first shape function mapping the first natural space data structure to the first design space data structure and a second shape function mapping the first natural space data structure to the finite element mesh;

modifying, via the processor, the first unit cell via the first design space data structure according to user inputs;

modifying, via the processor, the first unit cell via the first natural space data structure to correspond to the modifications of the first unit cell in the first design space data structure according to an inverse of the first shape function; and mating, via the processor, the first unit cell with a second unit cell via the first natural space data structure, the second unit cell corresponding to a second finite element having a second shape different than the first shape.

13. The method of claim 12, further comprising a step of generating, via the processor, a second design space data structure and a second natural space data structure such that the second finite element includes the second design space data structure and the second natural space data structure.

14. The method of claim 13, further comprising a step of generating, via the processor, the second unit cell such that the second unit cell corresponds to the second finite element.

15. The method of claim 14, further comprising a step of modifying, via the processor, the second unit cell via the second design space data structure according to user inputs.

16. The method of claim 15, further comprising a step of modifying, via the processor, the second unit cell via the second natural space data structure to correspond to the modifications of the second unit cell in the second design space data structure.

17. A method of creating a lattice structure for a part formed via additive manufacturing, the method comprising the steps of:
   generating, via a processor, a finite element mesh having a plurality of finite elements including a first finite element;
   generating, via the processor, a first natural space data structure such that the first finite element includes the first natural space data structure, the first natural space data structure being a data structure configured for back-end manipulation, deformation, linking, mating, unlinking, and demating;
   generating, via the processor, a first unit cell corresponding to the first finite element;
   generating, via the processor, a first design space data structure such that the first unit cell includes the first design space data structure and the first natural space data structure, the first design space data structure being configured for front-end manipulation, deformation, linking, mating, unlinking, and demating, the first design space data structure being a different data structure than the first natural space data structure;
   generating, via the processor, a geometric map between the first natural space data structure, the first design space data structure, and the finite element mesh, the geometric map including a first shape function mapping the first natural space data structure to the first design space data structure and a second shape function mapping the first natural space data structure to the finite element mesh;
   modifying, via the processor, the first unit cell via the first design space data structure according to user inputs;
   modifying, via the processor, the first unit cell via the first natural space data structure to correspond to the modifications of the first unit cell in the first design space data structure according to an inverse of the first shape function;
   modifying, via the processor, the first finite element to a deformed state; and
   modifying, via the processor, the first unit cell according to the deformed state of the first finite element via the first natural space data structure so that the first unit cell has a desired shape.

18. The method of claim 17, wherein the step of modifying the first finite element to a deformed state includes selecting, via the processor, a finite element shape from a plurality of shapes such that the first finite element has the selected finite element shape.

19. The method of claim 17, further comprising a step of mating, via the processor, the first unit cell with a second unit cell via the first natural space data structure and a second natural space data structure of the second unit cell.

20. The method of claim 17, further comprising modifying, via the processor, the first unit cell via the first design space data structure according to a snap-to location of one of a vertex location, an edge center, a face centroid, a volume centroid, an incenter, and a circumcenter.

* * * * *